(12) United States Patent
Dorum

(10) Patent No.: US 10,119,824 B2
(45) Date of Patent: Nov. 6, 2018

(54) METHOD AND APPARATUS FOR UPDATING ROAD MAP GEOMETRY BASED ON PROBE DATA

(71) Applicant: HERE Global B.V., Eindhoven (NL)

(72) Inventor: Ole Henry Dorum, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 15/449,142

(22) Filed: Mar. 3, 2017

(65) Prior Publication Data

US 2018/0252536 A1    Sep. 6, 2018

(51) Int. Cl.
  *G01C 21/32*  (2006.01)
  *G01C 21/34*  (2006.01)
  *G01C 21/36*  (2006.01)

(52) U.S. Cl.
  CPC ......... *G01C 21/32* (2013.01); *G01C 21/3673* (2013.01); *G01C 21/3682* (2013.01); *G01C 21/3694* (2013.01)

(58) Field of Classification Search
  CPC  G01C 21/32; G01C 21/3673; G01C 21/3682; G01C 21/3694; G01S 19/42
  See application file for complete search history.

(56) References Cited

U.S. PATENT DOCUMENTS

| | | | | |
|---|---|---|---|---|
| 6,385,539 | B1 * | 5/2002 | Wilson | G01C 21/30 340/905 |
| 9,322,660 | B2 | 4/2016 | Mund | |
| 2008/0262721 | A1 * | 10/2008 | Guo | G01C 21/32 701/532 |
| 2015/0242674 | A1 * | 8/2015 | Ahmed | G06K 9/00637 382/113 |

FOREIGN PATENT DOCUMENTS

EP  3 101 390 A1  12/2016

OTHER PUBLICATIONS

Zhang, L. et al. "Incremental Data Acquisition From GPS-Traces." Special Joint Symposium of ISPRS Commission IV and AutoCarto; Nov. 15-19, 2010; Orlando, Florida; 7 pages.
Tang, L. et al. "Road Network Change Detection Based on Floating Car Data." Journal of Networks, vol. 7, No. 7, Jul. 2012, 9 pages.
International Search Report and Written Opinion for Application No. PCT/EP2018/054692 dated May 30, 2018, 13 pages.

* cited by examiner

*Primary Examiner* — Michael J Zanelli
(74) *Attorney, Agent, or Firm* — Alston & Bird LLP

(57) ABSTRACT

A method is provided for generating and revising map geometry based on probe data. A method may include: map-matching a probe data point location to a roadway; identifying an established vertex corresponding to the location along the roadway; determining an average position corresponding to the established vertex; determining a variance of the established vertex; determining a number of data points having contributed to the average position and the variance of the established vertex; calculating a revised average position and a revised variance using the probe data point location, the average position, the variance, and the number of data points; and causing storage of the revised average position and revised variance for the established vertex in the memory and increasing the number of data points having contributed to the average position and the variance of the established vertex to facilitate update of a map representation including the established vertex with the revised average position.

27 Claims, 7 Drawing Sheets

METHOD AND APPARATUS FOR UPDATING ROAD MAP GEOMETRY BASED ON PROBE DATA

TECHNOLOGICAL FIELD

An example embodiment of the present invention relates to map generation and revision and, more particularly, to revising map geometry incrementally based on probe data and delegating the processing of the map geometry revisions.

BACKGROUND

Maps have been used for centuries for providing route geometry and geographical information. Conventional paper maps including static images of roadways and geographic features from a snapshot in history have given way to digital maps presented on computers and mobile devices. These digital maps can be updated and revised such that users have the most-current maps available to them each time they view a map hosted by a mapping service server. However, map features such as roadways and routes along roadways change with relative frequency due to new roadways and closing or rerouting of existing roadways, and mapping services may struggle to keep up with the map feature changes considering there are millions of miles of roads and thousands of road projects altering traffic routes on a constant basis.

BRIEF SUMMARY

A method, apparatus, and computer program product are provided in accordance with an example embodiment for revising map geometry based on probe data for a specific geographic region. In an example embodiment, a mapping system may be provided including a memory having map data and processing circuitry. The processing circuitry may be configured to: map-match a probe data point location to a roadway; identify an established vertex corresponding to the location along the roadway; determine an average position corresponding to the established vertex; determine a variance of the established vertex; determine a number of data points having contributed to the average position and the variance of the established vertex; calculate a revised average position and a revised variance using the probe data point location, the average position, the variance, and the number of data points; and cause storage of the revised average position and the revised variance for the established vertex in the memory and increasing the number of data points having contributed to the average position and the variance of the established vertex to facilitate update of a map representation including the established vertex with the revised position.

According to some embodiments, the processing circuitry configured to calculate a revised average position and a revised variance using the probe data point location may include processing circuitry configured to calculate a revised average position by adding to the average position the fraction of the probe data point location minus the average position divided by one more than the number of data points having contributed to the average position and factoring in the probe data point location as a single data point. The processing circuitry configured to calculate a revised average position and a revised variance using the probe data point location may include processing circuitry configured to calculate a revised variance by scaling the variance by the fraction of the number of data points divided by the one more than the number of data points having contributed to the average position of the established vertex and adding the fraction of the product of the difference between the probe data point location and the average position and the difference between the probe data point location and the revised average position and dividing the product by one more than the number of data points having contributed to the average position. The processing circuitry configured to identify an established vertex corresponding to the location along the roadway may include processing circuitry configured to: receive the average position corresponding to the established vertex from a map database; receive the variance of the established vertex from the map database; and receive the number of data points having contributed to the average position and the variance of the established vertex. The processing circuitry configured to cause storage of the revised average position and revised variance for the established vertex may include processing circuitry configured to provide revised average position and the revised variance to the map database to replace the average position and the variance.

Embodiments of the mapping system may include where the calculation of a revised average position and a revised variance is in response to the probe data point location being within a predefined distance of the average position, where the predefined distance is a multiple of a standard deviation of the average position. The average position may be a location along a polyline representing the roadway, where the variance may be the variance of locations of the data points having contributed to the average position along a direction normal to the polyline at the established vertex. The revised average position may be calculated based on a displacement of the probe data point location from the average position of the established vertex along the direction normal to the polyline at the established vertex. The processing circuitry may optionally be configured to generate the roadway from probe data tracks that do not correspond to an existing roadway, where the roadway includes a plurality of vertices. Identifying an established vertex may include identifying a vertex of the plurality of vertices that corresponds to the probe data point location within a predetermined distance.

Embodiments of the present invention may provide an apparatus including at least one processor and at least one memory including computer program code. The at least one memory and computer program code may be configured to, with the processor, cause the apparatus to: map-match a probe data point location on a roadway; identify an established vertex corresponding to the location along the roadway; determine an average position corresponding to the established vertex; determine a variance of the established vertex; determine a number of data points having contributed to the average position and the variance of the established vertex; calculate a revised average position and a revised variance using the probe data point location, the average position, the variance, and the number of data points; and cause storage of the revised average position and revised variance for the established vertex in the memory and increasing the number of data points having contributed to the average position and the variance of the established vertex to facilitate update of a map representation including the established vertex with the revised average position.

According to some embodiments, causing the apparatus to calculate a revised average position and a revised variance using the probe data point location may include causing the apparatus to calculate a revised average position by adding to the average position the fraction of the probe data point location minus the average position divided by one more than the number of data points having contributed to the average position and factoring in the probe data point location as a single point. Causing the apparatus to calculate a revised average position and a revised variance using the probe data point location may include causing the apparatus to calculate a revised variance by scaling the variance by the fraction of the number of data points divided by the one more than the number of data points having contributed to the average position of the established vertex and adding the fraction of the product of the difference between the probe data point location and the average position and the difference between the probe data point location and the revised average position and dividing the product by one more than the number of data points having contributed to the average position. Causing the apparatus to identify an established vertex corresponding to the location along the roadway may include causing the apparatus to: receive the average position corresponding to the established vertex from a map database; receive the variance of the established vertex from the map database; and receive the number of data points having contributed to the average position and the variance of the established vertex. Causing the apparatus to cause storage of the revised average position and the revised variance for the established vertex may include causing the apparatus to provide the revised average position and the revised variance to the map database to replace the average position and the variance.

Calculation of a revised average position and a revised variance may be performed in response to the probe data point location being within a predefined distance of the average position, wherein the predefined distance may be a multiple of a standard deviation of the average position. The average position may be a location along a polyline representing the roadway, and the variance may be the variance of locations of the data points having contributed to the average position along a direction normal to the polyline at the established vertex. The revised average position may be calculated based on a displacement of the probe data point location from the average position of the established vertex along the direction normal to the polyline at the established vertex. The apparatus may optionally be caused to generate the roadway from probe data tracks that do not correspond to an existing roadway, where the roadway includes a plurality of vertices. Identifying an established vertex may include identifying a vertex of the plurality of vertices that corresponds to the probe data point location within a predetermined distance.

Embodiments described herein may provide a computer program product including at least one non-transitory computer readable storage medium having computer executable program code portions stored therein. The computer-executable program code portions may include program code instructions configured to: map-match a probe data point location to a roadway; identify an established vertex corresponding to the location along the roadway; determine an average position corresponding to the established vertex; determine a variance of the established vertex; determine a number of data points having contributed to the average position and the variance of the established vertex; calculate a revised average position and a revised variance using the probe data point location, the average position, the variance, and the number of data points; and cause storage of the revised average position and revised variance for the established vertex in the memory and increasing the number of data points having contributed to the average position and the variance of the established vertex to facilitate update of a map representation including the established vertex with the revised average position.

According to some embodiments, the program code instructions configured to calculate a revised average position and a revised variance using the probe data point location may include program code instructions to calculate a revised average position by adding to the average position the fraction of the probe data point location minus the average position divided by one more than the number of data points having contributed to the average position and factoring in the probe data point location as a single data point. The program code instructions configured to identify an established vertex corresponding to the location along the roadway may include program code instructions configured to: receive the average position corresponding to the established vertex from a map database; receive the variance of the established vertex from the map database; and receive the number of data points having contributed to the average position and the variance of the established vertex. The program code instructions configured to cause storage of the revised average position and revised variance for the established vertex may include program code instructions configured to provide the revised average position and the revised variance to the map database to replace the average position and variance.

Embodiments may include where the calculation of a revised average position and a revised variance is performed in response to the probe data point location being within a predefined distance of the average position, where the predefined distance is a multiple of a standard deviation of the average position. The average position may be a location along a polyline representing the roadway, and the variance may be the variance of locations of the data points having contributed to the average position along a direction normal to the polyline at the established vertex. The revised average position may be calculated based on a displacement of the probe data point location from the average position of the established vertex along the direction normal to the polyline at the established vertex.

Embodiments described herein may provide a method including: map-matching a probe data point location to a roadway; identifying an established vertex corresponding to the location along the roadway; determining an average position corresponding to the established vertex; determining a variance of the established vertex; determining a number of data points having contributed to the average position and the variance of the established vertex; calculating a revised average position and a revised variance using the probe data point location, the average position, the variance, and the number of data points; and causing storage of the revised average position and revised variance for the established vertex in the memory and increasing the number of data points having contributed to the average position and the variance of the established vertex to facilitate update of a map representation including the established vertex with the revised average position.

According to some embodiments, calculating a revised average position and a revised variance using the probe data point location may include calculating a revised average position by adding to the average position the fraction of the probe data point location minus the average position divided by one more than the number of data points having contributed to the average position and factoring in the probe data point location as a single data point. Calculating a revised average position and a revised variance using the probe data point location may include calculating a revised variance by scaling the variance by the fraction of the number of data points divided by the one more than the number of data points having contributed to the average position of the established vertex and adding the fraction of the product of the difference between the probe data point location and the average position and the difference between the probe data point location and the revised average position and dividing the product by one more than the number of data points having contributed to the average position. Identifying an established vertex corresponding to the location along the roadway may include: receiving the average position corresponding to the established vertex from a map; receiving the variance of the established vertex from the map database; and receiving the number of data points having contributed to the average position and the variance of the established vertex. Causing storage of the revised average position and the revised variance for the established vertex may include providing revised average position and the revised variance to the map database to replace the average position and the variance.

Calculating of a revised average position and a revised variance is performed in response to the probe data point location being within a predefined distance of the average position, wherein the predefined distance is a multiple of a standard deviation of the average position. The average position may be a location along a polyline representing the roadway, where the variance may be the variance of locations of data points having contributed to the average position along a direction normal to the polyline at the established vertex. The revised average position may be calculated based on a displacement of the probe data point location from the average position of the established vertex along the direction normal to the polyline at the established vertex. Methods may include generating the roadway from probe data tracks that do not correspond to an existing roadway, where the roadway includes a plurality of vertices. Identifying an established vertex may include identifying a vertex of the plurality of vertices that corresponds to the probe data point location within a predetermined distance.

BRIEF DESCRIPTION OF THE DRAWINGS

Figure 1:
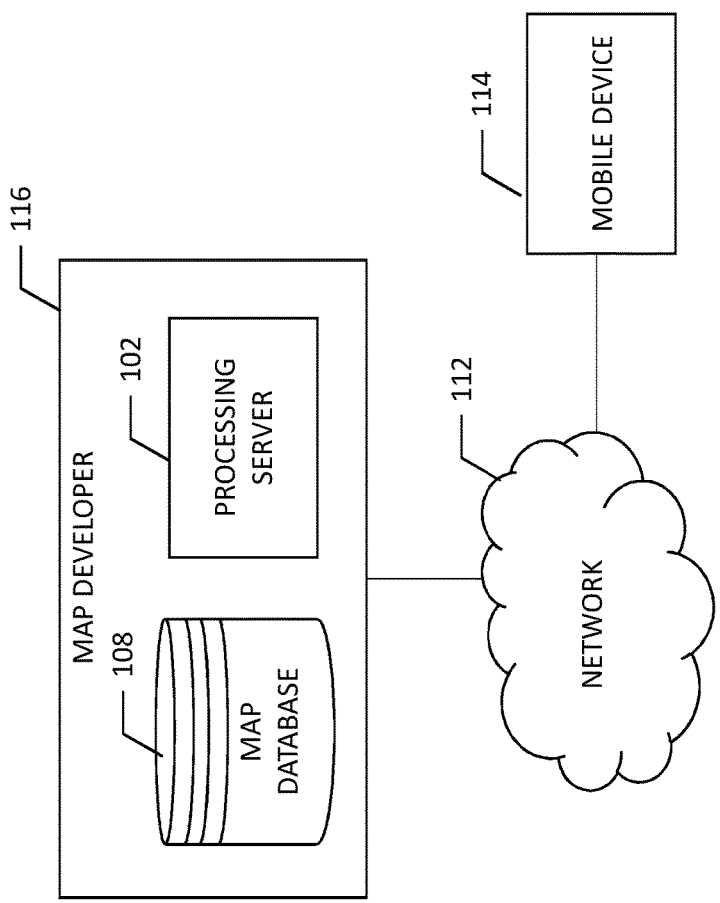
Figure 2:
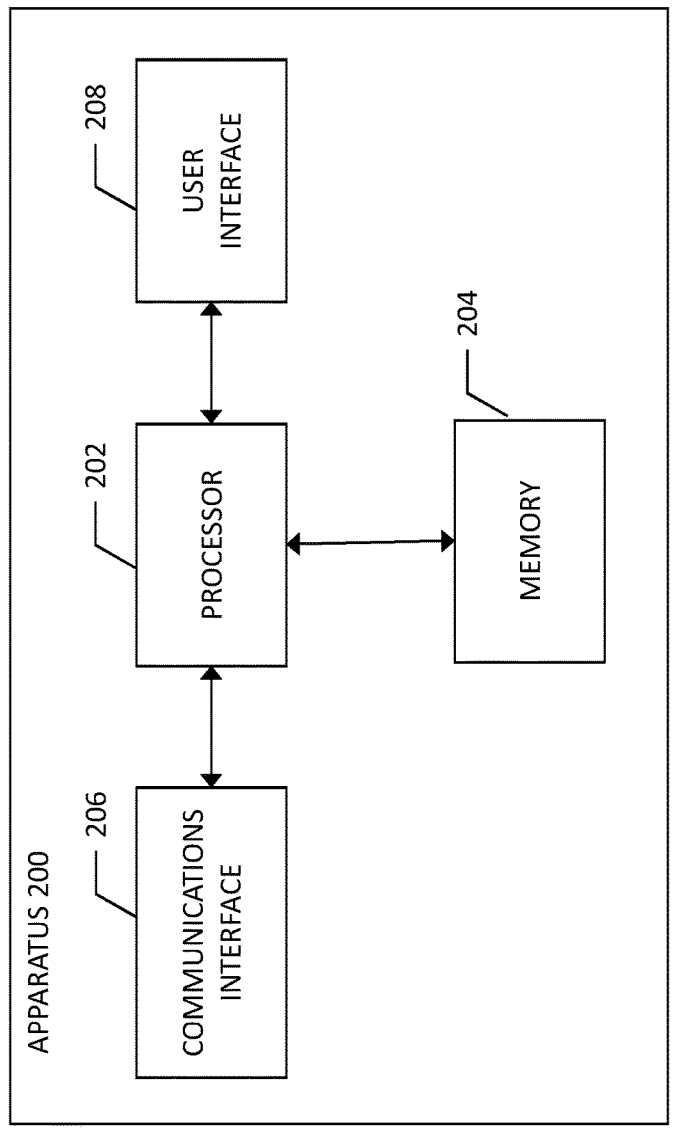
Figure 3:
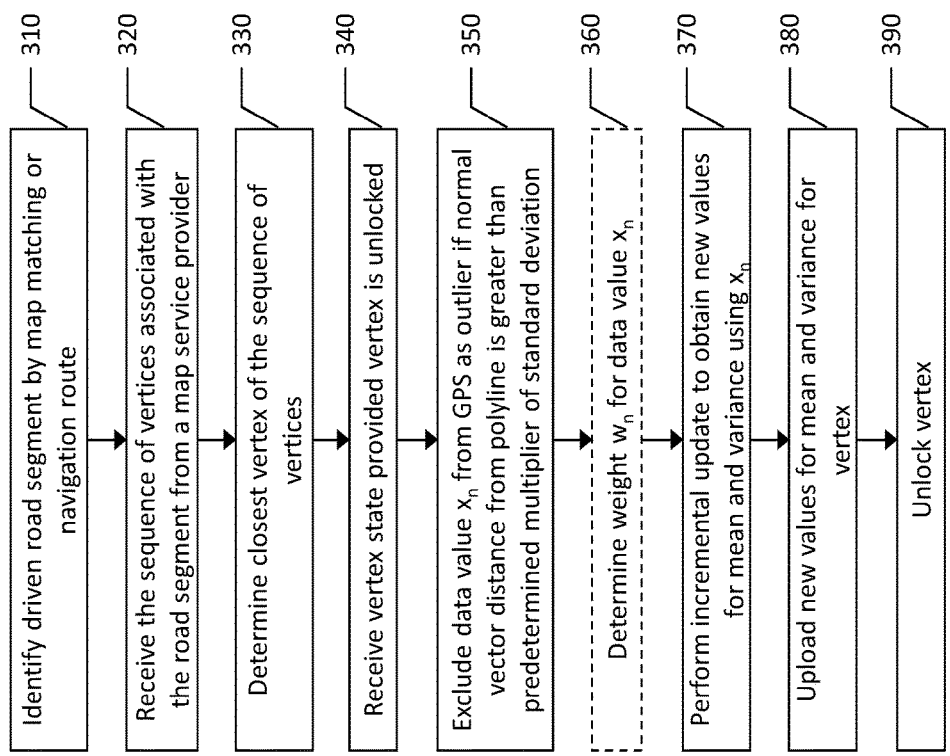
Figure 4:
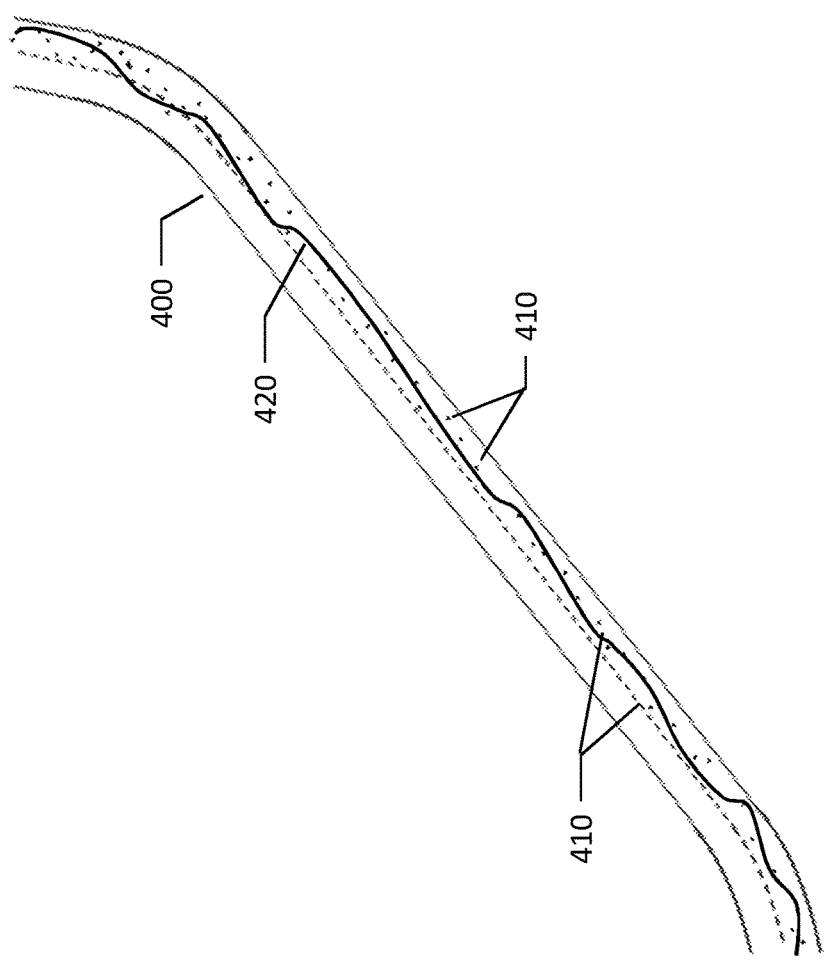
Figure 5:
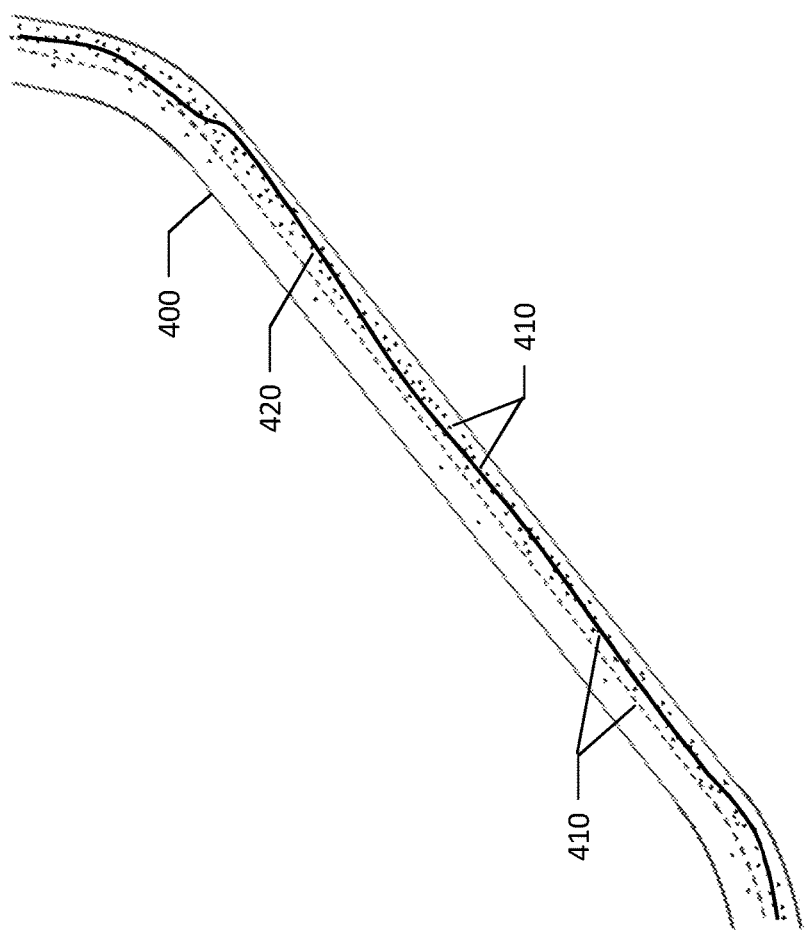
Figure 6:
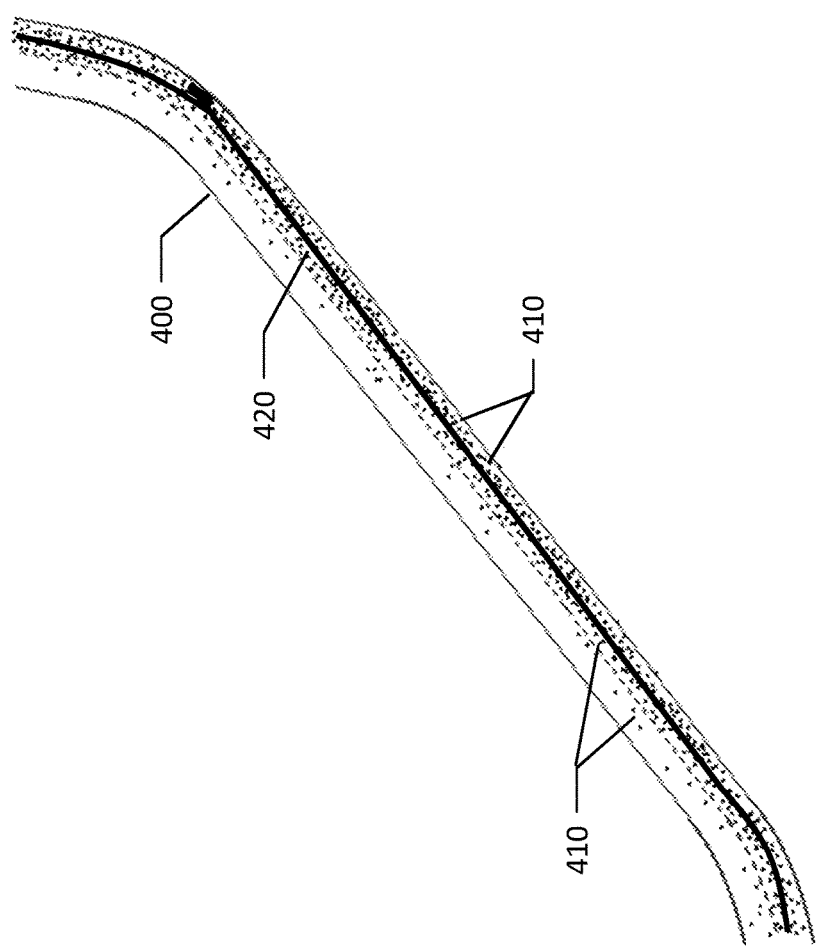
Figure 7:
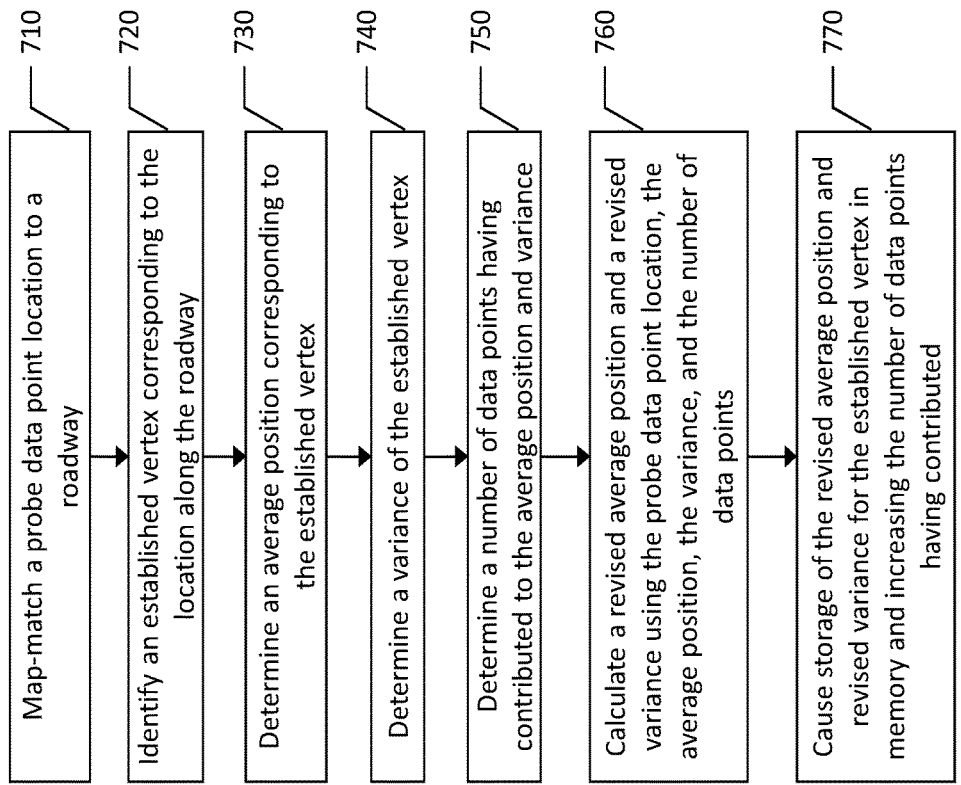

Having thus described example embodiments of the invention in general terms, reference will now be made to the accompanying drawings, which are not necessarily drawn to scale, and wherein:

FIG. 1 illustrates a communications diagram in accordance with an example embodiment of the present invention;

FIG. 2 is a block diagram of an apparatus that may be specifically configured for generating and revising map geometry based on probe data in accordance with an example embodiment of the present invention;

FIG. 3 illustrates a flowchart depicting a method of updating the location and variance of a vertex of a polyline representing a roadway according to an example embodiment of the present invention;

FIG. 4 depicts a roadway including a relatively low number of probe data points and the resulting polyline shape from incrementally adding the probe data points according to an example embodiment of the present invention;

FIG. 5 depicts a roadway including a plurality of probe data points and an improved polyline shape from incrementally adding the new probe data points according to an example embodiment of the present invention;

FIG. 6 depicts a roadway including a relatively high number of probe data points and the refined polyline shape from incrementally adding the additional probe data points according to an example embodiment of the present invention; and FIG. 7 illustrates a flowchart depicting a method of updating the location and variance of a vertex of a polyline representing a roadway according to another example embodiment of the present invention;

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

As defined herein, a "computer-readable storage medium," which refers to a non-transitory physical storage medium (for example, volatile or non-volatile memory device), can be differentiated from a "computer-readable transmission medium," which refers to an electromagnetic signal.

A method, apparatus, and computer program product are provided herein in accordance with an example embodiment for generating or revising map geometry incrementally based on probe data. FIG. 1 illustrates a communication diagram of an example embodiment of a system for implementing example embodiments described herein. The illustrated embodiment of FIG. 1 includes a map developer system 116, a processing server 102 in data communication a geographic map database, e.g., map database 108 through a network 112, and one or more mobile devices 114. The mobile device 114 may be associated, coupled, or otherwise integrated with a vehicle, such as an in-dash vehicle navigation unit, a vehicle head unit, electronic control unit, or an advanced driver assistance system (ADAS), for example. Additional, different, or fewer components may be provided. For example, many mobile devices 114 may connect with the network 112. The map developer 116 may include computer systems and network of a system operator. The processing server 102 may include the map database 108, such as a remote map server. The network may be wired, wireless, or any combination of wired and wireless communication networks, such as cellular, Wi-Fi, internet, local area networks, or the like.

Processing server 102 may be one or more fixed or mobile computing devices. The mobile device 114 may be configured to access the map database 108 via the processing server 102 through, for example, a mapping application, such that the user equipment may provide navigational assistance to a user among other services provided through access to the map developer 116.

The map database 108 may include node data, road segment data or link data, point of interest (POI) data, or the like. The map database 108 may also include cartographic data, routing data, and/or maneuvering data. According to some example embodiments, the road segment data records may be links or segments representing roads, streets, or paths, as may be used in calculating a route or recorded route information for determination of one or more personalized routes. The links or roadways may be represented by polylines, where each polyline comprises a plurality of vertices establishing the path of the roadway geometry. The node data may be end points corresponding to the respective links or segments of road segment data. The road link data and the node data may represent a road network, such as used by vehicles, cars, trucks, buses, motorcycles, and/or other entities. Optionally, the map database 108 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 108 can include data about the POIs and their respective locations in the POI records. The map database 108 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 108 can include event data (e.g., traffic incidents, construction activities, scheduled events, unscheduled events, etc.) associated with the POI data records or other records of the map database 108.

The map database 108 may be maintained by a content provider e.g., a map developer. By way of example, the map developer can collect geographic data to generate and enhance the map database 108. According to some embodiments, the map database 108 may delegate map generation and revision to other devices, such as mobile device 114. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used to generate map geometries directly or through machine learning as described herein.

The map database 108 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by mobile device 114, for example. The navigation-related functions can correspond to vehicle navigation, pedestrian navigation, or other types of navigation. While example embodiments described herein generally relate to vehicular travel along roads, example embodiments may be implemented for pedestrian travel along walkways, bicycle travel along bike paths, boat travel along maritime navigational routes, etc. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the server side map database 108 may be a master geographic database, but in alternate embodiments, a client side map database 108 may represent a compiled navigation database that may be used in or with end user devices (e.g., mobile device 114) to provide navigation and/or map-related functions. For example, the map database 108 may be used with the mobile device 114 to provide an end user with navigation features. In such a case, the map database 108 can be downloaded or stored on the end user device (mobile device 114) which can access the map database 108 through a wireless or wired connection, such as via a processing server 102 and/or the network 112, for example. Optionally, a portion of the map database 108, such map data regarding a specific roadway, may be downloaded or stored temporarily on an end user device, and according to various embodiments described herein, the mobile device 114 may be configured to modify the map data regarding a roadway before sending the map data back to the map database 108.

In one embodiment, the mobile device 114 can be an in-vehicle navigation system, such as an ADAS, a personal navigation device (PND), a portable navigation device, a cellular telephone, a smart phone, a personal digital assistant (PDA), a watch, a camera, a computer, and/or other device that can perform navigation-related functions, such as digital routing and map display. A mobile device for navigation and map functions such as guidance and map display, for example, and for determination of one or more personalized routes or route segments based on one or more calculated and recorded routes, according to some example embodiments.

The processing server 102 may receive probe data from a mobile device 114 or a device in communication with mobile device 114. The mobile device 114 may include one or more detectors or sensors as a positioning system built or embedded into or within the interior of the mobile device 114. Alternatively, the mobile device 114 uses communications signals for position determination. The mobile device 114 may receive location data from a positioning system, such as a global positioning system (GPS), cellular tower location methods, access point communication fingerprinting, or the like. The server 102 may receive sensor data configured to describe a position of a mobile device, or a controller of the mobile device 114 may receive the sensor data from the positioning system of the mobile device 114. The mobile device 114 may also include a system for tracking mobile device movement, such as rotation, velocity, or acceleration. Movement information may also be determined using the positioning system. The mobile device 114 may use the detectors and sensors to provide data indicating a location of a vehicle. This vehicle data, also referred to herein as "probe data", may be collected by any device capable of determining the necessary information, and providing the necessary information to a remote entity. The mobile device 114 is one example of a device that can function as a probe to collect probe data of a vehicle.

More specifically, probe data (e.g., collected by mobile device 114) is representative of the location of a vehicle at a respective point in time and may be collected while a vehicle is traveling along a route. While probe data is described herein as being vehicle probe data, example embodiments may be implemented with pedestrian probe data, marine vehicle probe data, or non-motorized vehicle probe data (e.g., from bicycles, skate boards, horseback, etc.). According to the example embodiment described below with the probe data being from motorized vehicles traveling along roadways, the probe data may include, without limitation, location data, (e.g. a latitudinal, longitudinal position, and/or height, GPS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The mobile device 114, may be any device capable of collecting the aforementioned probe data. Some examples of the mobile device 114 may include specialized vehicle mapping equipment, navigational systems, mobile devices, such as phones or personal data assistants, or the like.

An example embodiment of a processing server 102 may be embodied in an apparatus as illustrated in FIG. 2. The apparatus, such as that shown in FIG. 2, may be specifically configured in accordance with an example embodiment of the present invention for incrementally updating map geometry based on real-time probe data. The apparatus may include or otherwise be in communication with a processor 202, a memory device 204, a communication interface 206, and a user interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor 202). The memory device may be configured to store information, data, content, applications, instructions, or the like, for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor specific device (for example, a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data to/from a communications device in communication with the apparatus, such as to facilitate communications with one or more mobile devices 114 or the like. In this regard, the communication interface may include, for example, an antenna (or multiple antennae) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may, in turn, be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 204, and/or the like).

Example embodiments of the present invention may provide a mechanism for revising map information (e.g., stored in map database 108) using probe data (e.g., from mobile device 114) from a plurality of vehicles traveling along one or more roadways in a particular geographic region. Map information, such as paths of roadways, direction of traffic on said roadways, intersections, and the like may be stored, for example, in map database 108. As roadway infrastructure is subject to deterioration over time, road construction on existing roadways is an inevitable event that will alter roadways at least temporarily. Further, increases in population and vehicular traffic result in the need for new or expanded roadways, while other roadways may be removed or replaced. The term "roadways," as used herein, may refer to any path a vehicle may take in moving from one place to another. Roadways may be paved, improved roadways, gravel roadways, dirt trails, or the like, such that roadways does not imply that the mapped roads are necessarily recognized as county, state, or federally maintained roads, and may include private roadways such as access roads, neighborhood streets, and the like. As these roadways may change over the course of time, map information related to these roadways may require revision to keep up with the changes to the roadway paths.

Example embodiments described herein provide a mechanism to update or change roadway geometry using probe data in an incremental manner that not only benefits from data generated by a plurality of probes traveling along roadways, but can offload some degree of processing to the probes and mobile devices 114 associated therewith. The methods described herein uses incremental mean and incremental variance to update a mean location value and variance or standard deviation for a vertex of a roadway using each new probe data point without requiring extensive processing capacity.

The generation and updating of roadway shapes including the position of vertexes or points along a roadway can be a complex, processing-intensive activity that requires large amounts of data, complex algorithms, processing capacity, and time. Conventionally, the generation and updating of roadway shapes and the positions of vertices along the roadways may be performed in a bulk processing procedure using a large amount of historical probe data to update the average vertex location along a roadway using all probe data associated with vehicles having traveled along the roadway. An average location of the probe data points proximate the vertex may be used to establish a location of the vertex (e.g., latitude and longitude or Cartesian coordinates) and the data may be used to establish a standard deviation of the data associated with the vertex.

A vertex of a roadway may be a point along the roadway that defines the location of the roadway. A vertex may be initially established through a known vehicle or probe, such as a mapping data services probe vehicle, traversing a path with a high degree of accuracy. Optionally, a vertex may be established based on a plurality of data points gathered from a plurality of probes to establish the location of a vertex of a roadway without requiring a mapping data service provider to traverse the roadway with a highly accurate mapping probe vehicle. The location of a vertex may be established using the arithmetic mean of probe location proximate the vertex. Each vertex may lie along a polyline that is generated from the plurality of vertices of a roadway to generate a mapped roadway.

Mobile devices 114 that function as probes to generate probe data points traveling along a roadway may report their location in the form of probe data points. These probe data points may include various information beyond location, such as heading, speed, vehicle identification, vehicle type, or the like. However, in the case of location, the location may be established as an absolute location, including latitude and longitude. The measure of the location from the mapped roadway polyline may be determined based on a normal vector from the roadway polyline to the probe data point. The distance represented by the normal vector may be the probe data point's deviation from the established roadway polyline at the point or vertex along the polyline from which the normal vector extends. This vertex may be subject to updating based on the probe data points that are associated with the vertex.

Conventionally, historical probe data associated with a vertex may be gathered and averaged to establish if the roadway polyline vertex should be shifted. An average or arithmetic mean ($\mu$) may be established according to the following equation, with $x_i$ representing the distance of a probe data point from the vertex.

$$\mu = \bar{x} = \frac{x_1 + x_2 + \ldots + x_n}{n} = \frac{1}{n}\sum_{i=1}^{n} x_i \qquad (1)$$

Similarly, a standard deviation or variance ($\sigma^2$) can be established for the probe data points associated with the vertex using the historical probe data points according to the following equation.

$$\sigma^2 = \frac{(x_1 - \mu)^2 + (x_2 - \mu)^2 + \ldots + (x_n - \mu)^2}{n} = \frac{1}{n}\sum_{i=1}^{n}(x_i - \mu)^2 \qquad (2)$$

Where $$\mu = \frac{1}{n}\sum_{i=1}^{n} x_i.$$

Using the mean $\mu$ and the standard deviation $\sigma$, a confidence interval can be derived computed as follows:

$$\bar{x} \pm z^* \frac{\sigma}{\sqrt{n}} \qquad (3)$$

A 95% confidence interval, for example, yielding a significance level of $\alpha = 0.05$ since $$1 - \alpha = \frac{95}{100} = 0.95,$$

we get from the Cumulative Distribution Function $\Phi(z)$:

$$\Phi(z) = 1 - \frac{\alpha}{2} = 0.975 \tag{4}$$

So that:

$$z^* = \Phi^{-1}\left(\Phi\left(1 - \frac{\alpha}{2}\right)\right) = \Phi^{-1}(0.975) = 1.96 \tag{5}$$

Yielding a 95% confidence interval around the mean:

$$\bar{x} \pm 1.96 \frac{\sigma}{\sqrt{n}} \tag{6}$$

As demonstrated above, to establish a mean and standard deviation of a vertex of a polyline for a roadway using probe data points can be computationally intensive requiring processing capacity, historical data, and time. Further, as the number of vertices of a roadway polyline can be very large, these computations may need to be done repeatedly for determining the average position of a roadway polyline and the standard deviation thereof. Processing the average position of a roadway and standard deviation would be unlikely to be a highly regular task and may only be performed periodically, which may be insufficient for adequate accuracy of some roadways, particularly before, during, and after roadwork is performed which may change the location and availability of a roadway several times during the course of a roadway construction project.

Embodiments described herein avoid the need for periodic bulk calculation of roadway position and take advantage of an incremental mean and incremental variance technique to consistently and accurately update the location of a vertex of a roadway polyline in substantial real-time while minimizing the processing requirements of a mapping data service provider to do so. Instead of requiring large amounts of data to be processed for each vertex for each update, the only information required for an update is the mean value for a location of the vertex ($\mu_{n-1}$), the variance of the vertex ($\sigma_{n-1}$), and the number of data points (n−1) having contributed so far to the mean value for location and the variance.

In an example embodiment, a mobile device 114 may travel along a roadway and provide probe data location information to, for example, a map data services provider such as map developer 116. In turn, the map developer 116 may send roadway polyline vertex information corresponding to the probe data location to the mobile device 114. That roadway polyline vertex information may include the mean value for the location of the vertex ($\mu_{n-1}$), the variance of the vertex ($\sigma_{n-1}$), and the number of data points (n−1) having contributed so far to the mean value for location and the variance. In turn, the mobile device 114 may incrementally update the mean value of the location of the vertex, the variance of the vertex, and the number of data points contributing to the mean and variance of the vertex. The incremental mean formula for updating the mean ($\mu_{n-1}$) of the vertex is as follows:

$$\mu_n = \mu_{n-1} + \frac{1}{n}(x_n - \mu_{n-1}) \tag{7}$$

The new mean $\mu_n$ is the prior mean ($\mu_{n-1}$) updated with new data value $x_n$ from the probe data point of the mobile device 114. The incremental formula for updating the variance $\sigma_{n-1}^2$ with the new data value $x_n$ is:

$$\sigma_n^2 = \frac{(n-1)\sigma_{n-1}^2 + (x_n - \mu_{n-1})(x_n - \mu_n)}{n} \tag{8}$$

Alternately, the incremental update equation (8) can be rewritten by multiplying both sides of the equation by the number of data points n, thus instead updating the variance $\sigma_n^2$, we update the variance scaled by n, yielding:

$$S_n = n\sigma_n^2 \tag{9}$$

$S_n$ can then be incrementally updated by the less computationally intensive formula:

$$S_n = S_{n-1} + (x_n - \mu_{n-1})(x_n - \mu_n) \tag{10}$$

from which the revised variance $\sigma_n^2$ can be computed by dividing $S_n$ by n afterwards:

$$\sigma_n^2 = \frac{S_n}{n} \tag{11}$$

As noted above, the position of the probe data point may be used to generate a normal vector and distance from the vertex of the polyline. However, location data for the probe data point, which may be gathered by a Global Positioning System (GPS), may be associated with an uncertainty or accuracy metric, which may be derived from the GPS dilution of precision. To offset the uncertainty of the GPS location, each probe data point may be associated with a weight Iv, enabling an incremental weighted mean and incremental weighted variance to be used and incorporated into a new data value for $x_n$ to include weight $w_n$. The weight may, for example, be a representation of the relative confidence or accuracy of the GPS of a respective probe data point.

$$\mu_n = \mu_{n-1} + \frac{w_i}{W_n}(x_n - \mu_{n-1}) \tag{12}$$

Where $W_n$ is the sum of the weights $$W_n = \sum_{i=1}^{n} w_i$$

which may be incrementally updated:

$$W_n = W_{n-1} + w_n \tag{13}$$

Using the above weighted formula, an incremental weighted variance may be calculated according to the following:

$$\sigma_n^2 = \frac{W_{n-1}\sigma_{n-1}^2 + w_n(x_n - \mu_{n-1})(x_n - \mu_n)}{W_n} \tag{15}$$

The new mean $\mu_n$ and new variance or weighted variance $\sigma_n^2$ may be sent by the mobile device 114 to the map developer 116 in order to update the location of the vertex with an associated variance based on the addition of the probe data point from the mobile device 114. Using the methods described herein, the vertex representing the road center position along a polyline may be updated easily and may offload the processing to the mobile device 114. While the processing using the incremental formulas above may be relatively low, given the large number of probe data points reported by the plurality of probes along any given road, the processing of millions of data points becomes overwhelming and limited by processing capacity. Offloading the processing of incremental means and incremental variances to the mobile devices 114 may have little impact on the mobile devices 114, but may have a substantial impact on the map developer 116 and processing server 102 through distributed processing.

Beyond the benefits of distributed processing using the methods described above for incrementally revising roadway polyline vertices locations, embodiments described herein may also provide an added benefit of anonymous data collection. When a mobile device 114 receives the mean and variance for a vertex, the mobile device may update the mean and vertex according to the location data of a probe associated with the mobile device 114. The mobile device 114 may then provide the revised mean and variance to the map developer 116, inclusive of the probe data from the mobile device, without the map developer 116 ever having accessed the probe data of the mobile device. Such anonymity may provide assurances to users that their data is secure and anonymous, while also potentially complying with various privacy laws of various jurisdictions.

While the aforementioned method may be useful in updating the location of a vertex along a roadway polyline, some probe data points may be discounted as outliers and not factored in to the mean or variance. Outliers may be caused by GPS error that may be the result of features that influence the accuracy of a GPS location, for example, urban canyons, tunnels, bridges, or the like, and may produce data which is not representative of the roadway. Outliers may include probe data points that are determined to lie too far from the road center, represented by the roadway polyline, such that they are excluded from consideration. For example, if the normal vector between the probe data point and the roadway polyline is more than a predetermined multiplier of the standard deviation a from the polyline, then it may be excluded and not used to calculate a new mean or variance. A multiplier may be, for example, 2.5, such that the threshold distance beyond which probe data points are excluded is 2.5 times the standard deviation.

Methods described above use a normal vector from the roadway polyline to establish a value for location of the probe data point relative to a vertex, example embodiments may use the raw Cartesian coordinates (x, y) or latitude and longitude for establishing a location of the probe data point relative to a vertex of the roadway polyline, which is less sensitive to heading errors in the roadway polyline. Further, each vertex of the roadway may include a heading, which may be incrementally updated in a manner similar to that of the location of the vertex. The vertex heading can be incrementally updated based on the mean heading of the previously recorded probe data points, and a heading from the current probe data point. A variance for the heading can be established and incrementally updated in the same manner.

Embodiments described herein can be applied to existing roads in a map database 108 of a map developer 116 to update the geometry shape as well as validate the existence of roadways and polylines representing roadways. A map database may include different types of roads, such as divided highways, undivided, narrow two-way streets, one way streets, etc. Different update methodologies for incremental updates to the locations of vertices of roadway polylines may be needed. For a residential street, or a narrow, two-way street, there may be a single polyline that represents the roadway for both directions of travel. Thus, probe data points heading in both directions on the road need to be considered when updating the location of vertices of the polyline representing that road. For divided highways, there may be a single polyline for each direction of travel, and we may only need to consider probes with heading directions that match those of the associated roadway. Still further, according to some embodiments, roads may include polylines on a per-lane basis, in which case a first operation would be to associate each probe data point with a specific lane of travel. However, in each instance, incremental updates may be performed according to the same general methodology outlined above.

According to some embodiments, probe data points may be received for roadways that do not exist in the map database 108 of a map developer 116. These may be new roads, re-routed roads, detours, or roads not previously mapped. One method of establishing new roadways may be to perform an initial averaging of bulk probe data that may be stored, for example, in map database 108. The bulk probe data may be used as illustrated in equations (1) through (6) to generate an initial mean position and variance for a roadway polyline. Once an initial roadway polyline is created with vertices, the incremental method described above for revising and updating the vertices can be applied.

As the incremental updating of the mean location and variance of a vertex may be dependent upon a mobile device 114 performing the update, simultaneous updating of the mean location and variance of the vertex may not be possible. For example, in a scenario in which a single roadway polyline represents multiple lanes in the same heading, multiple vehicles may be proximate a vertex at substantially the same time. An incremental update to that vertex mean and variance may be performed by one of the mobile devices 114 according to its respective probe data point, and the vertex mean and variance may be "locked" by the updating mobile device 114 until the update is complete, and the lock is released. Once the vertex is unlocked, the next mobile device 114 using its probe data point may perform an incremental update, supplementing the update of the prior mobile device 114. This mechanism allows only one vehicle or mobile device to update each vertex at a time.

While the aforementioned method for incrementally updating the mean location and variance of a vertex of a roadway polyline has been described as being offloaded to a mobile device 114 for processing, according to some embodiments, the incremental updates including the mean calculation and variance calculation can be performed by the processing server 102 of the map developer 116. Such an embodiment may facilitate incremental updates using multiple probe data points at the same time, or in rapid succession. For example, if two probe data points associated with a single vertex arrive at about the same time, an incremental update may be performed using an average of the two probe data points and a probe data point count of two.

In order to render the methods described herein backwards-compatible with roadway polylines that were not generated using vertices and associated probe data points, example embodiments may use existing mapped roadways and create a dense sequence of vertices S for each road segment by inserting vertices (e.g., every five meters) to allow refinement of the road link geometry polyline between existing shape points as stored in the map database. An initial variance and virtual probe count or sum of weights for each vertex may be determined. For roads not in the mapping database 108, a roadway polyline may be generated from an initialization with first high-frequency probe trajectory data and setting n=1 (or derive $W_1$ from GPS error), $\sigma_1^2=0$, $\mu_1=(x, y)$ or (latitude, longitude).

FIGS. 3 and 7 illustrate flowcharts illustrative of a method according to example embodiments of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present invention and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions that execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems that perform the specified functions, or combinations of special purpose hardware and computer instructions.

FIG. 3 illustrates a flowchart depicting a method of incrementally updating the location and variance of a vertex of a roadway polyline according to an example embodiment of the present invention where the incremental updates of road geometry are performed through distributed processing at mobile devices 114. At 310, a road segment along which a vehicle is driven having a probe or in which a mobile device 114 is disposed generating probe data is map-matched to a road segment of the map data. The sequence of vertices associated with the map-matched road segment may be provided to the mobile device 114 at 320, and a determination of the probe data location relative to the closest vertex of the sequence of vertices may be made at 330. The probe data location may be established, for example, via GPS and correlated to the closest vertex from the map data provided from map database 108 from map developer 116. At 340, it is determined whether the vertex is unlocked and available for updating, or if it is locked while being updated by another device. Once the vertex is established as unlocked, it becomes locked for updating by the mobile device 114. At 350, a determination is made as to whether the probe data point from the mobile device 114 associated with the vertex is within a predefined distance of the vertex location provided by the map developer 116. This predefined distance may be a multiple of the standard deviation to ensure the probe data point is not an outlier relative to the vertex location. The multiplier of the standard deviation may be, for example, 2.5, such that approximately 99% of probe data points should fall within the predefined distance. Optionally, in a noisy environment where GPS data may be prone to error, such as in an urban canyon, the standard deviation multiplier may be lower to eliminate more noise. At 360, the weight for the data value from the probe data point may optionally be determined. At 370, an incremental update to the vertex information provided by the map developer 116 may be performed as described through equations (7) to (11) above. Once the updated values for the mean and variance of the vertex are established, they may be uploaded at 380 to the map developer 116 for storage in the map database 106, and the vertex is unlocked at 390 for updating by another probe.

An example illustration of how the updating of vertices of a roadway polyline are illustrated in FIGS. 4-6. As shown in FIG. 4, traffic probe data for a missing road segment may be initialized from high frequency vehicle trajectory information from probe data in one or both directions of travel depending upon the road type. A high-fidelity polyline may be established as shown in FIG. 4, where probe data points are represented by dots 410, and a resulting polyline shape from incrementally adding the probe data points shown as polyline 420. Due to the relatively sparse probe data points 410, the initial geometry of the polyline 420 is relatively noisy and not highly representative of the actual roadway 400 geometry. As shown in FIG. 5, as the number of probe data points 410 increases, the polyline 420 becomes a better fit, but is still not a perfect representation of the actual roadway 400 geometry. FIG. 6 illustrates a polyline 420 that is a considerably more accurate representation of the roadway 400 geometry due to a substantial increase in the number of probe data points from along the roadway.

FIG. 7 illustrates a flowchart of a method according to an example embodiment of the present invention for incrementally updating the average location and variance of vertices of a polyline that represents a roadway. Probe data, which includes a probe data point location, may be map-matched to a roadway based on proximity as shown in 710. An established vertex of the polyline representing the roadway may be identified at 720. An average position corresponding may be determined at 730, and an average variance of the established vertex may be determined at 740. A number of data points having contributed to the average position and variance may be determined at 740. Using the average position, the variance, and the number of data points, a revised average position and a revised variance may be calculated using the probe data point location as shown at 760. The revised average position and revised variance may be stored in a memory and associated with the established vertex at 770, while the number of data points having contributed to the revised average position and revised variance is increased. According to some embodiments, the stored data may be used to provide for display of a representation of the roadway on a map with a revised, more accurate position of the roadway based on the revised average position and the revised variance.

In an example embodiment, an apparatus for performing the method of FIG. 7 above may comprise a processor (e.g., the processor 202) configured to perform some or each of the operations (710-770) described above. The processor may, for example, be configured to perform the operations (710-770) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 710-770 may comprise, for example, the processor 202 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A mapping system comprising:
a memory comprising map data; and
processing circuitry configured to:
map-match a probe data point location to a roadway;
identify an established vertex corresponding to the location along the roadway;
determine an average position corresponding to the established vertex;
determine a variance of the established vertex;
determine a number of data points having contributed to the average position and the variance of the established vertex;
calculate a revised average position and a revised variance using the probe data point location, the average position, the variance, and the number of data points;
cause storage of the revised average position and revised variance for the established vertex in the memory and increasing the number of data points having contributed to the average position and the variance of the established vertex;
update a map representation of the roadway in the map data to include the established vertex with the revised average position; and
provide data for route guidance along the roadway based on the updated map representation including the established vertex having the revised average position.

2. The mapping system of claim 1, wherein the processing circuitry configured to calculate a revised average position and a revised variance using the probe data point location comprises processing circuitry configured to:
calculate a revised average position by adding to the average position the fraction of the probe data point location minus the average position divided by one more than the number of data points having contributed to the average position and factoring in the probe data point location as a single data point.

3. The mapping system of claim 1, wherein the processing circuitry configured to calculate a revised average position and a revised variance using the probe data point location comprises processing circuitry configured to:
calculate a revised variance by scaling the variance by the fraction of the number of data points divided by the one more than the number of data points having contributed to the average position of the established vertex and adding the fraction of the product of the difference between the probe data point location and the average position and the difference between the probe data point location and the revised average position and dividing the product by one more than the number of data points having contributed to the average position.

4. The mapping system of claim 1, wherein the processing circuitry configured to identify an established vertex corresponding to the location along the roadway comprises processing circuitry configured to:
receive the average position corresponding to the established vertex from a map database;
receive the variance of the established vertex from the map database; and
receive the number of data points having contributed to the average position and the variance of the established vertex.

5. The mapping system of claim 4, wherein the processing circuitry configured to cause storage of the revised average position and the revised variance for the established vertex comprises processing circuitry configured to:
provide the revised average position and the revised variance to the map database to replace the average position and the variance.

6. The mapping system of claim 1, wherein the calculation of the revised average position and the revised variance is performed in response to the probe data point location being within a predefined distance of the average position, wherein the predefined distance is a multiple of a standard deviation of the average position.

7. The mapping system of claim 1, wherein the average position is a location along a polyline representing the roadway, and wherein the variance is the variance of locations of the data points having contributed to the average position along a direction normal to the polyline at the established vertex.

8. The mapping system of claim 7, wherein the revised average position is calculated based on a displacement of the probe data point location from the average position of the established vertex along the direction normal to the polyline at the established vertex.

9. The mapping system of claim 1, wherein the processing circuitry is further configured to:
generate the roadway from probe data tracks that do not correspond to an existing roadway, wherein the roadway comprises a plurality of vertices;
wherein identifying an established vertex comprises identifying a vertex of the plurality of vertices that corresponds to the probe data point location within a predetermined distance.

10. An apparatus comprising at least one processor and at least one memory including computer program code, the at least one memory and computer program code configured to, with the processor, cause the apparatus to at least:
  map-match a probe data point location to a roadway;
  identify an established vertex corresponding to the location along the roadway;
  determine an average position corresponding to the established vertex;
  determine a variance of the established vertex;
  determine a number of data points having contributed to the average position and the variance of the established vertex;
  calculate a revised average position and a revised variance using the probe data point location, the average position, the variance, and the number of data points;
  cause storage of the revised average position and revised variance for the established vertex in the memory and increasing the number of data points having contributed to the average position and the variance of the established vertex;
  update a map representation of the roadway in a map database to include the established vertex with the revised average position; and
  provide data for route guidance along the roadway based on the updated map representation including the established vertex having the revised average position.

11. The apparatus of claim 10, wherein causing the apparatus to calculate a revised average position and a revised variance using the probe data point location comprises causing the apparatus to:
  calculate a revised average position by adding to the average position the fraction of the probe data point location minus the average position divided by one more than the number of data points having contributed to the average position factoring in the probe data point location as a single data point.

12. The apparatus of claim 10, wherein causing the apparatus to calculate a revised average position and a revised variance using the probe data point location comprises causing the apparatus to:
  calculate a revised variance by scaling the variance by the fraction of the number of data points divided by the one more than the number of data points having contributed to the average position of the established vertex and adding the fraction of the product of the difference between the probe data point location and the average position and the difference between the probe data point location and the revised average position and dividing the product by one more than the number of data points having contributed to the average position.

13. The apparatus of claim 10, wherein causing the apparatus to identify an established vertex corresponding to the location along the roadway comprises causing the apparatus to:
  receive the average position corresponding to the established vertex from a map database;
  receive the variance of the established vertex from the map database; and
  receive the number of data points having contributed to the average position and the variance of the established vertex.

14. The apparatus of claim 13, wherein causing the apparatus to cause storage of the revised average position and the revised variance for the established vertex comprises causing the apparatus to:
  provide the revised average position and the revised variance to the map database to replace the average position and the variance.

15. The apparatus of claim 10, wherein the calculation of the revised average position and the revised variance is performed in response to the probe data point location being within a predefined distance of the average position, wherein the predefined distance is a multiple of a standard deviation of the average position.

16. The apparatus claim 10, wherein the average position is a location along a polyline representing the roadway, and wherein the variance is the variance of locations of the data points having contributed to the average position along a direction normal to the polyline at the established vertex.

17. The apparatus of claim 16, wherein the revised average position is calculated based on a displacement of the probe data point location from the average position of the established vertex along the direction normal to the polyline at the established vertex.

18. The apparatus of claim 10, wherein the apparatus is further caused to:
  generate the roadway from probe data tracks that do not correspond to an existing roadway, wherein the roadway comprises a plurality of vertices;
  wherein identifying an established vertex comprises identifying a vertex of the plurality of vertices that corresponds to the probe data point location within a predetermined distance.

19. A method comprising:
  map-matching a probe data point location to a roadway;
  identifying an established vertex corresponding to the location along the roadway;
  determining an average position corresponding to the established vertex;
  determining a variance of the established vertex;
  determining a number of data points having contributed to the average position and the variance of the established vertex;
  calculating a revised average position and a revised variance using the probe data point location, the average position, the variance, and the number of data points;
  causing storage of the revised average position and revised variance for the established vertex in the memory and increasing the number of data points having contributed to the average position and the variance of the established vertex;
  updating a map representation of the roadway in a map database to include the established vertex with the revised average position; and
  providing data for route guidance along the roadway based on the updated map representation including the established vertex having the revised average position.

20. The method of claim 19, wherein calculating a revised average position and a revised variance using the probe data point location comprises:
  calculating a revised average position by adding to the average position the fraction of the probe data point location minus the average position divided by one more than the number of data points having contributed to the average position and factoring in the probe data point location as a single data point.

21. The method of claim 19, wherein calculating a revised average position and a revised variance using the probe data point location comprises:
  calculating a revised variance by scaling the variance by the fraction of the number of data points divided by the one more than the number of data points having contributed to the average position of the established vertex and adding the fraction of the product of the difference between the probe data point location and the average position and the difference between the probe data point location and the revised average position and dividing the product by one more than the number of data points having contributed to the average position.

22. The method of claim 19, wherein identifying an established vertex corresponding to the location along the roadway comprises:
receiving the average position corresponding to the established vertex from a map database;
receiving the variance of the established vertex from the map database; and
receiving the number of data points having contributed to the average position and the variance of the established vertex.

23. The method of claim 22, wherein causing storage of the revised average position and the revised variance for the established vertex comprises:
Providing the revised average position and the revised variance to the map database to replace the average position and the variance.

24. The method of claim 19, wherein the calculation of the revised average position and the revised variance is performed in response to the probe data point location being within a predefined distance of the average position, wherein the predefined distance is a multiple of a standard deviation of the average position.

25. The method of claim 19, wherein the average position is a location along a polyline representing the roadway, and wherein the variance is the variance of locations of the data points having contributed to the average position along a direction normal to the polyline at the established vertex.

26. The method of claim 25, wherein the revised average position is calculated based on a displacement of the probe data point location from the average position of the established vertex along the direction normal to the polyline at the established vertex.

27. The method of claim 19, further comprising:
generating the roadway from probe data tracks that do not correspond to an existing roadway, wherein the roadway comprises a plurality of vertices;
wherein identifying an established vertex comprises identifying a vertex of the plurality of vertices that corresponds to the probe data point location within a predetermined distance.

* * * * *